United States Patent [19]

Buc

[11] Patent Number: 4,524,882

[45] Date of Patent: Jun. 25, 1985

[54] MOLDED CONTAINER AND CLOSURE

[76] Inventor: John L. Buc, 144 N. Third Ave., Des Plaines, Ill. 60016

[21] Appl. No.: 505,799

[22] Filed: Jun. 20, 1983

[51] Int. Cl.³ .............................................. B64D 41/16

[52] U.S. Cl. .................................... 220/306; 220/307; 220/354

[58] Field of Search ................. 220/306, 307, 354, 90; 206/508, 509

[56] References Cited

U.S. PATENT DOCUMENTS

| | | | |
|---|---|---|---|
| 2,885,108 | 5/1959 | Donoghue | 220/354 |
| 3,566,946 | 3/1971 | MacDonald | 150/15 |
| 4,293,080 | 10/1981 | Letica | 220/306 |
| 4,308,970 | 1/1982 | Von Holdt | 220/306 |
| 4,334,631 | 6/1982 | Ballester | 220/306 |
| 4,349,119 | 9/1982 | Letica | 220/307 X |
| 4,356,930 | 11/1982 | Roper | 220/306 |
| 4,397,404 | 8/1983 | Blanchette | 220/307 X |

*Primary Examiner*—Steven M. Pollard
*Attorney, Agent, or Firm*—Richard J. Myers

[57] ABSTRACT

The open end of a substantially cylindrical injection molded resilient plastic container, such as a paint pail, has a rim system integrally molded to the container wall to rigidify the open end of the container to facilitate filling the container using standard automatic filling equipment. An outer continuous rim and an inner discontinuous rim concentric with the outer rim are joined by a bridge member to form a substantially rigid rim system at the open end of the container.

The rim system coacts with a closure lid to form a removable and resealable end closure on the container. Drainage or expulsion of fluid from between the inner and outer rims is provided for by drain openings or slots which make the inner rim discontinuous.

23 Claims, 9 Drawing Figures

MOLDED CONTAINER AND CLOSURE

BACKGROUND OF THE INVENTION

1. Field of the Invention

This invention relates to cylindrical containers having an open end sealed by a removable and resealable closure.

2. Description of the Prior Art

Wide mouth cylindrical containers, such as well known metal, and more recently molded plastic, paint pails are commercially used in very high volumes and consequently must be readily fillable and sealable using automated filling and sealing equipment.

Also, such containers must have very reliable but removable and resealable end closures or lids which ideally can be conveniently removed without the need of special tools and can be resealed to protect remaining product contained within a container from contamination and/or deterioration.

These containers should be producible and useable at a cost which enables them to be disposable when the contents have been depleted. Additional features prior art container designs have often provided are stackability of one container upon the other and placement of containers in abutting side by side proximity to each other to minimize the space occupied by a plurality of containers during shipment, storage and when displayed on shelves at the point of sale.

Automated filling equipment was generally used to fill the well known prior art metal containers which had rigid annular open top ends and relatively rigid cylindrical walls to maintain a fixed height.

With the advent of the use of molded or otherwise formed plastic containers it became necessary to design the containers using either relatively expensive rigid injected blow molded plastics or using configurations which required structural features which extended beyond the conventional structural confines of the container to cause cost penalties and/or space storage penalties.

U.S. Pat. No. 3,566,946 shows a container formed of a molded resilient plastic having a Y-shaped rim which protrudes outside of the normal space occupying structure of the container.

U.S. Pat. Nos. 4,293,080; 4,308,970 and 4,349,119 each show molded plastic containers in which the open ends of the containers disclosed have a substantial molded single rim molded lip which coacts with a pair of structural elements on the closure to form a removable and resealable end closure. These constructions appear to place dominant structural rigidity in the lid rather than on the open end of the container and therefore do not maximize the efficiency of the container for use with automated filling equipment.

SUMMARY OF THE INVENTION

A cylindrical container, such as a paint pail, is formed by injected molded substantially resilient plastic material and has an open end having a rim system which substantially rigidifies the open end to facilitate filling the container with conventional automated filling equipment such as that normally used to fill metal containers or containers formed of relatively costly rigid plastics.

The rim system is molded or otherwise formed integral with an upper open end of the container. The rim system is comprised of a continuous annular bridge member molded integral with the container wall, an outer continuous rim molded integral with and extending axially upward from the bridge member and an inner discontinuous rim spaced radially inward from the outer rim and molded integral with the extending axially upward from the bridge member.

The rim system provides structural rigidity to the open end of the container and coacts with an enlarged annular terminal sealing and engagement end member of a depending annular rim of an end closure lid or cover to form a removable and resealable end closure.

DETAILED DESCRIPTION OF THE INVENTION

Figure 1:
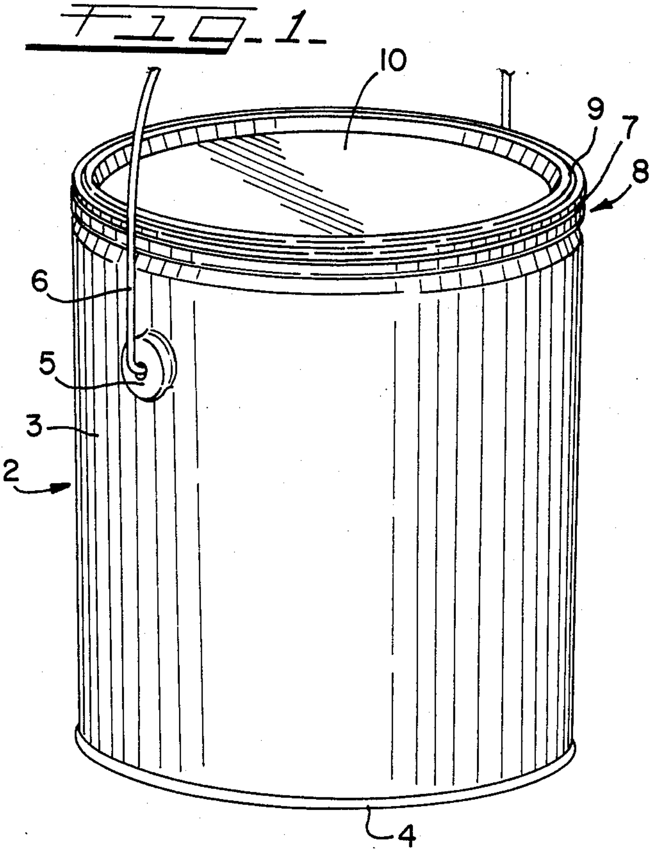
FIG. 1 is a perspective view of a cylindrical container having the rim system and closure of this invention.
Figure 3:
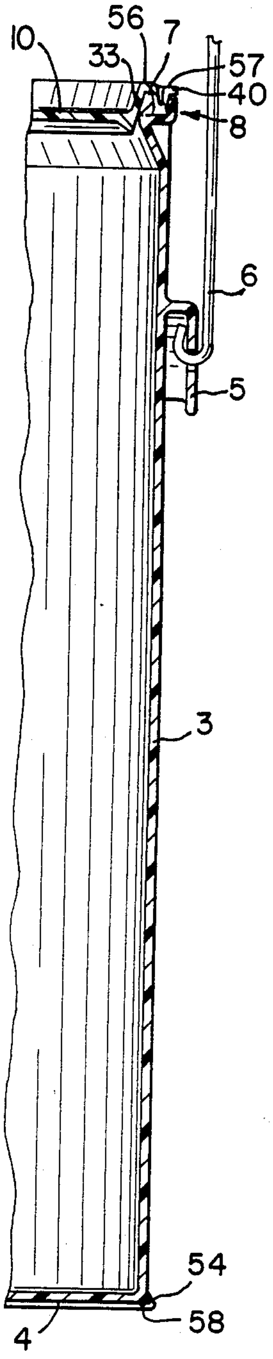
FIG. 3 is a partial sectional view of a container such as that shown in FIG. 1 showing a full section of a portion of each the top, bottom and side of the container.

FIG. 1 shows in a perspective view and FIG. 3 shows in a partial sectional view a cylindrical container assembly 2 having a substantially cylindrical side wall 3 and a closed and sealed lower end or bottom 4 molded integral with wall 3. Typically, as shown, a pair of bail or handle attached brackets, such as bracket 5, are affixed to the side wall in diametrically opposed positions and a bail or handle such as formed wire handle 6, is pivotally attached to each bracket to enable the container to be grasped and manually transported using one hand.

Container assembly 2 has an upper or top open end 7 defined by an annular rim system 8 which is molded integral with the side wall 3. The rim system coacts with a rim structure 9 on a removable and resealable end closure or lid 10 to enable the top of the container to be selectively opened and resealed.

Figure 2:
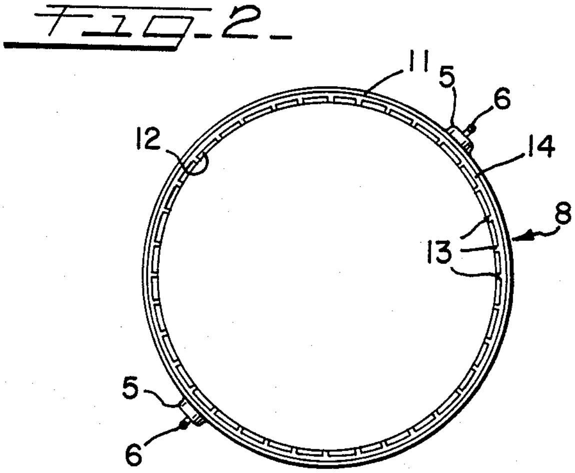
FIG. 2 is a top plan view of the container shown in FIG. 1 in which the closure has been removed.

FIG. 2 is a top plan view of the container shown in FIGS. 1 and 3 in which the end closure 10 has been removed to expose rim system 8. Rim system 8 is comprised of an outer continuous rim 11 and an inner discontinuous rim 12 being ported with a plurality of equally spaced openings or slots 13. As shown, rim 12 is concentric with and radially inwardly spaced from outer continuous rim 11 whereby a continuous annular space 14 is formed between rims 11 and 12.

Figure 4:
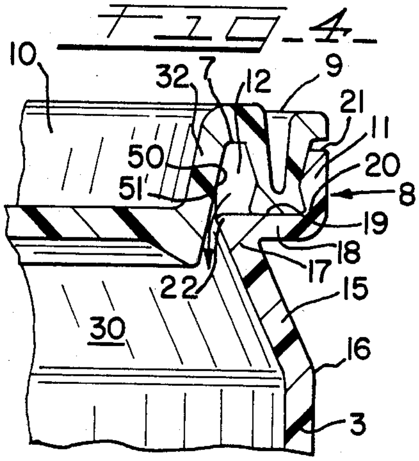
FIG. 4 is an enlarged partial sectional view showing in cross-section the rim system and closure construction of this invention and showing a drainage opening in the rim system.

FIG. 4 shows an enlarged sectioned view of rim system 8 molded integral with the wall 3 of the container and how the rim system 8 coacts with the elements of rim 9 of closure of lid 10 to form a removable sealing end closure on the container. As shown, wall 3 preferably has a radially inwardly inclined annular upwardly converging taper portion 15 which angles inwardly from the normal orientation of wall 3 at a selected point, such as 16, and terminates at the top 17 of wall 3. Molded integral with and radially extending outwardly from top 17 of wall 3 is a bridge member 18 having a substantially axially upward facing seal surface 19.

The continuous annular outer rim 11 is molded integral with an outer peripheral portion 20 of member 18. Outer rim 11 is sealing engaged with member 18 and extends axially upward from seal surface 19 and has a terminal uppermost end 21.

The discontinuous annular inner rim 12 is molded integral with bridge member 18 at or adjacent a radially inner periphery 22 and extends axially upwardly from seal surface 19 to an uppermost terminal end which defines the open end 7 of the cylindrical wall 3 of container 2.

Figure 6:
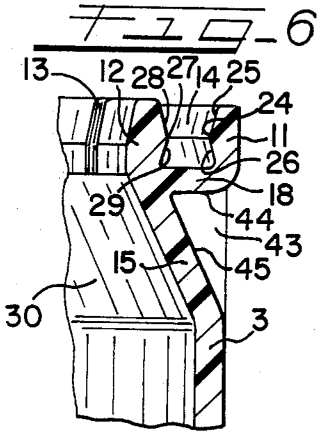
FIG. 6 is a partial sectioned view showing a first alternate embodiment of this invention.

Referring to FIG. 6, inner rim 12 is concentric with and radially inwardly spaced from outer rim 11 to provide the annular space 14. Space 14 is defined at its outer periphery by a radially inward facing surface of outer rim 11 and this surface is comprised of an annular apex 24, an axially upward extending and radially outward extending annular taper surface 25 and an axially downward extending and radially outward extending annular taper surface 26.

Similarly, space 14 is defined at its inner periphery by a radially outward facing surface of inner rim 12 and this surface is comprised of a discontinuous annular apex 27, an axially upward extending and radially inward extending discontinuous annular taper surface 28 and an axially downward extending and radially inward extending discontinuous annular taper surface 29.

As shown in FIGS. 2 and 6 slots or openings 13 which extend through rim 12 place space 14 in fluid flow communication with the interior content containing portion 30 of container 2 to enable fluid to flow from annular space 14 through openings 13 into space 30.

Figure 5:
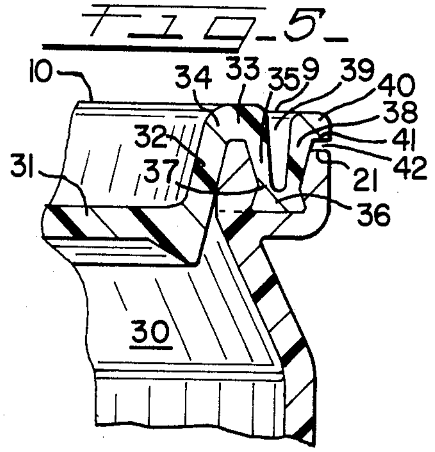
FIG. 5 is an enlarged partial sectioned view showing in cross-section the rim system and closure construction of the invention.

Referring now to FIG. 5 end closure or lid 10 is comprised of a substantially circular body 31 having an outer periphery 31 prime to which is integrally molded rim 9.

Rim 9 is comprised of an axially upward and radially outward extending annular taper surface or inner annular portion 32 integrally formed with body 31, an annular lid bridge portion 33 mold integral with an upper terminal end 34 of taper surface 32, an axial downward extending continuous lid inner rim 35, an enlarged lid engagement seal portion 36 molded integral with a lower terminal end portion 37 of lid inner rim 35 and a lid outer rim member 38 which is molded integral with portion 36 and extends axially upward and radially outward from seal portion 36. As shown, lid outer rim 37 is radially outwardly spaced from and concentric with lid inner rim 35 and a continuous annular space 39 is formed between them.

As shown in FIG. 5, a radially outward extending shoulder 40 is molded integral with and extends radially outward from lid outer rim 38. Shoulder 40 has a lower shoulder surface 41 which is axially spaced from top surface 21 of outer rim 11 of container 2 to form a gap 42 which allows introduction of any conventional tool, such as a blade screwdriver, into gap 42 to pry lid 10 from container 2 by a prying or twisting movement of the tool.

Figure 7:
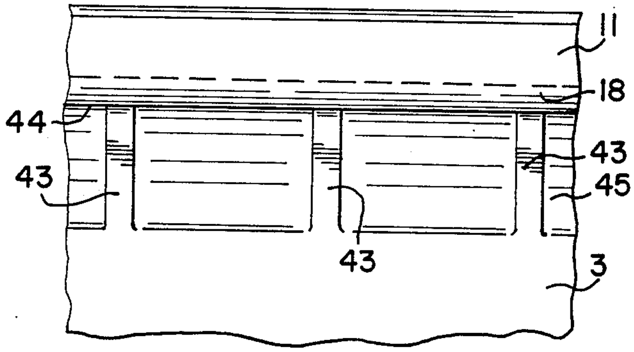
FIG. 7 is a partial side view of the embodiment shown in FIG. 6.

FIGS. 6 and 7 show an alternate embodiment having a plurality of triangular support members 43 molded between a lower surface 44 of bridge member 18 and an outer surface 45 of tapered wall portion 15 of wall 3.

As shown in FIG. 7, these support members are incrementally and equally spaced about annular portion 15 to provide added hoop and axial strength to the rim system forming the open end of container 2.

Figure 8:
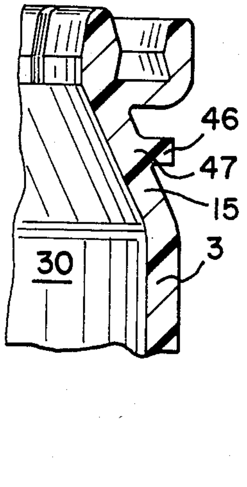
FIG. 8 is a partial sectional view of a second alternate embodiment of this invention.
Figure 9:
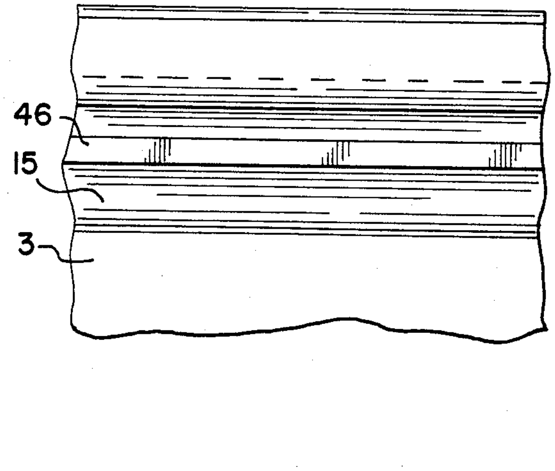
FIG. 9 is a partial side view of the embodiment shown in FIG. 8.

FIGS. 8 and 9 show a second alternate embodiment of the invention shown in FIGS. 1 through 5 in which a radially extending annular hoop strength increasing rim 46 is molded integral with an intermediate external portion 47 of tapered portion 15 of wall 3.

As shown, the strength increasing embodiments 43 and 46 shown in FIGS. 6 and 7 and FIGS. 8 and 9, respectively, do not extend beyond the outer surface 48 of wall 3 and consequently do not increase the space required to store the containers.

Additionally, as best shown in FIG. 4, taper portion 32 of lid 10 is provided with a radially outward facing tapered surface 50 which engages a radially inward facing tapered surface 51 of discontinuous inner rim 12. As shown, taper 51 terminates above surface 19 of bridge member 18 and terminal end 22 of tapered portion 15 of wall 3 is radially outwardly spaced from tapered surface 50 whereby a flow path as indicated by the arrows for fluid entrapped between rims 11 and 12 is provided through openings 13 into the interior 30 of the container as the lid 10 is forced axially onto the container.

An additional feature of the container of this invention, as best shown in FIG. 3, is a depending annular stacking bead 54 moulded integral with the terminal lower end 55 of wall 3 and a stepped seat formed on lid 10 by uppermost terminal surface 56 of lid bridge member 33 being axially higher than the axially upper most surface 57 of shoulder 40 whereby the bottom 4 of one container rests on surface 56 and the terminal lower most surface 58 of bead 54 rests on surface 57 to promote stackability of a plurality of containers upon each other.

Advantages and operation of this invention are as follows. With the lid 10 removed as shown in FIGS. 2, 6, and 7 the rim system 8 provides an open end 7 for the container 2 which has sufficient hoop strength and axial strength to be compatible with conventional automated filling equipment and the container can be formed by conventional economically effective injection molding techniques using a resilient plastic materal, such as polyethylene, to which a well known strengthening agent, such as a microbead glass filler, may be added.

Due to the resiliency of the material and the configuration of the container and rim system the container can be formed using non-collapsing tooling which enables a significant tooling cost saving. The radially inwardly inclined upwardly extending taper portion 15 of wall 3 forms a tool withdrawal ramp. Upon axial withdrawal of a non-collapsing tool from within the container out through the open end of the container the internal surface of the taper bears against the tool and urges the restricted open end and the rim system to resiliently expand to permit withdrawal of the tool. After removal of the tool the rim system and annular tapered portion of the container wall resiliently return radially inwardly to their molded size substantially as shown in FIGS. 4, 5, 6 and 8.

Placement of the lid 10 onto the rim system 8 by introducing the enlarged engagement member 36 of the rim 9 to the space 14 between the inner and outer rim of the rim system 8 on the container and axially forcing the lid downward causes the engagement member 36 to compress and the space 14 between the rims to expand as the engagement member 36 forces them radially inwardly and outwardly respectively.

As the lid progresses axially downwardly the engagement member 36 forces any fluid between the inner and outer rims to flow through the discontinuous inner rim 12 into the interior 30 of the container.

Upon reaching the apexes 27 and 24 of the inner and outer rims, respectively, the engagement member expands to its uncompressed size into sealing engagement with the tapered surfaces 26 and 29 below the apexes of the rims and the inner and outer rim members 12 and 11, respectfully, radially return outwardly and inwardly, respectively, to assume their normal positions.

Thus the lid bead is sealingly engaged and mechanically entrapped to form a strong, leak free end closure substantially as shown in FIGS. 4 and 5. Additionally, as shown taper 32 of lid 10 serves to urge discontinuous rim 12 on the container into locking engagement with lid inner rim 35.

The connection between the enlarged seal member 36 on the lid and each of the tapered portions 26 and 29 below the apexes 24 and 27 respectively provides a double mechanical lock of the lid to the container. The annular space 39 between rim members 35 and 38 provides a cushioning effect between these double locks to increase the closed and sealed container's ability to pass stringent functional requirements such as a drop test to aid in eliminating conventional opening of the container. An abrupt force imposed upon portion 33 will be cushioned due to the resiliency of the material and the rim member 35 can flex from such a force without affecting the seal between outer rim 11 and the enlarged seal member 36. Similarly, an abrupt force can be placed on portion 40 which can flex independently of rim 35 and inner rim 12. Therefore, this system provides a double lock feature whereby each lock is relatively isolated from each other to aid in preventing unintentional opening of the container.

To remove the lid a conventional pry tool is placed in gap 42 as shown in FIG. 5 and the installation process as described above is substantially reversed. Once the enlarged engagement portion of the lid rim has been forced axially above the apexes of the rims of the container rims system the lid can generally be readily removed manually from the container without the need of tools.

Radially inward facing surface 51 of inner rim 12 of the container conveniently serves as a brush wipe for the user of these containers and the product wiped from the brush is able to drain back into the container through openings 13 rather than be trapped within annular space 14 as is the case with conventional metal containers.

The foregoing disclosure of specific embodiments is illustrative of the broad inventive concepts conceived by the inventor.

What is claimed is:

1. In a plastic container having a substantially cylindrical wall portion, a bottom member sealingly closing a lower end of said cylindrical wall portion of said container and an upper end of said cylindrical wall portion being open and defined by a closure receiving and sealing rim system, said rim system comprising:

a continuous annular resilient plastic bridge member formed integral with and extending around said upper end of said cylindrical wall;

an outer continuous annular resilient plastic rim formed integral with said bridge member and extending axially upwardly from said bridge member;

an inner discontinuous annular resilient plastic rim molded integral with said bridge member and extending axially upwardly from said bridge member, said inner rim being concentric with and radially inwardly spaced from said outer rim whereby said bridge member, said continuous outer rim and said discontinuous inner rim form a closure receiving and sealing container end which remains substantially radially annular and axially rigid.

2. The invention as defined in claim 1 in which said discontinuous inner rim is formed having a plurality of slots extending transversely across said rim, said slots placing a space between said inner and said outer rim in fluid flow communication with the interior of said container.

3. The invention as defined in claim 1 in which said outer rim has a continuous annular radially inwardly facing portion having a radially inwardly extending annular apex and a first surface tapering radially upwardly and outwardly from said apex toward the top portion of said outer rim and a second surface tapering downwardly and outwardly from said apex toward a top surface of said bridge member for resiliently receiving and sealingly entrapping an enlarged engagement portion of a rim of a sealing closure for said container.

4. The invention as defined in claim 1 in which said inner discontinuous rim has a radially outward facing portion having a radially outward extending discontinuous annular apex and a first surface tapering radially inward and axially upward from said apex toward a top portion of said inner rim and a second surface tapering radially inward and axially downward from said apex toward a top surface of said bridge member for resiliently receiving and sealingly entrapping an enlarged engagement portion of a rim of a sealing enclosure for said continer.

5. The invention as defined in claim 1 in which:

said outer rim has a continuous annular radially inwardly facing portion having a radially inwardly extending annular apex and a first surface tapering radially upwardly and outwardly from said apex toward the top portion of said outer rim and a second surface tapering downwardly and outwardly from said apex toward a top surface of said bridge member for resiliently receiving and sealingly entrapping an enlarged engagement portion of a rim of a sealing closure for said container; and said inner discontinuous rim has a radially outward facing portion having a radially outward extending discontinuous annular apex and a first surface tapering radially inward and axially upward from said apex toward a top portion of said inner rim and a second surface tapering radially inward and axially downward from said apex toward a top surface of said bridge member for resiliently receiving and sealingly entrapping an enlarged engagement portion of a rim of a sealing enclosure for said container whereby said rim system provides double locking surfaces.

6. The invention as defined in claim 5 together with an end closure on said container, said end closure having an axially downwardly extending continuous annular rim having an enlarged portion forming a continuous annular terminal end and said end closure being sealingly engaged with said sealing rim system by having said enlarged terminal portion of said downwardly extending rim forced axially between said inner rim and said outer rim of said rim system whereby said inner rim and said outer rim are forced resiliently radially inwardly and radially outwardly respectively until said enlarged portion is forced axially beyond said apexes of said surfaces of said inner and each said inner and said outer rim and said apexes resiliently return toward each other to entrap said enlarged portion into sealing engagement with said outer rim and an axially upwardly facing seal surface of said bridge member.

7. The invention as defined in claim 6 in which said downwardly extending continuous annular rim of said end closure is formed of a pair of concentric rims, each of said rims of said pair of rims having a lower end portion joined to said enlarged seal member and each of said rims of said pair of rims having an upper end portion radially spaced from each other for forming an annular space between a substantial upper portion of each of said rims for aiding in preventing forces imposed on one of said pair of rims to be transferred to the other of said pair of rims.

8. The invention as defined in claim 1 in which said upper open end of said cylindrical wall is comprised of a axially upward extending and radially inward extending taper and said bridge member is formed integral with an upper terminal end of said taper.

9. The invention as defined in claim 8 together with a plurality of triangular support members formed integral with radially outward facing surface of said upper open end wall taper and with a lower surface portion of said bridge member for increasing the axial and radial strength of said rim system.

10. The invention as defined in claim 8 together with an annular hoop strength increasing rim formed integral with a radially outward facing surface portion of said upper open end wall taper for increasing the radial strength of said open end.

11. A resilient plastic end closure being adapted for removably sealing a container wherein the open end of said container being of the type having a rim structure of an outer rim, and an inner rim, the inner rim being concentric with and radially inwardly spaced from the outer rim for forming an annular space between said inner and said outer rims with the lower end of said annular space terminating in a sealing surface with the end closure, said end closure comprising:

a generally central circular body portion;

an inner annular portion being integral with the body portion and projecting from the periphery thereof;

an annular closure bridge member being integral with the inner annular portion and projecting radially outward therefrom;

an annular inner closure rim being integral with said closure bridge member and projecting axially downward;

an annular seal portion being integral with said inner closure rim and projecting radially outward from the lower end thereof;

an annular outer closure rim being integral with the outer periphery of the seal portion projecting axially upward therefrom and radially spaced from the inner closure rim and forming in conjunction with the inner closure rim and the seal portion and downwardly extending annular seal member for insertion into the annular space between the inner container rim and the outer container rim for resilient mechanical entrapment and sealing engagement with the open end of the container and forming with the inner closure rim a pair of concentric spaced closure rims for prevention of the transfer of forces imposed on one of the pair of said rims to the other of said pair, said seal member, in cross section, narrowing and tapering axially upward from the seal portion and defining a substantially conical cross-section, the inner closure rim and the outer closure rim each, in cross section, narrowing downward in joining with the seal portion, thereby forming a stronger resilient seal with the container rim portion.

12. The invention according to claim 11 where said inner annular portion extends radially outward and axially upward from body portion.

13. The combination of an end closure and a container therefor wherein:

said container comprising:

a cylindrical container wall;

a bottom member sealingly closing the lower end of a cylindrical wall;

a continuous annular container bridge member being integral with and extending around the upper end of said cylindrical wall;

an outer continuous annular container rim being integral with said bridge member and extending axially upwardly from said container bridge member;

an inner annular container rim being integral with said container bridge member and extending axially upwardly from said container bridge member, said inner container rim being concentric with and radially inwardly spaced from said outer container rim and forming an annular space between said inner and outer container rims, whereby said container bridge member, said continuous outer container rim and said continuous inner container rim form a rim structure which substantially rigidifies said container and accommodates said end closure;

said closure comprising: a generally central circular body portion;

an inner annular portion being integral with the body portion and projecting from the periphery thereof;

an annular closure bridge member being integral with the inner annular portion and projecting radially outward therefrom;

an annular inner closure rim being integral with said closure bridge member and projecting axially downward;

an annular seal portion being integral with said inner closure rim and projecting radially outward from the lower end thereof;

an annular outer closure rim being integral with the outer periphery of the seal portion projecting axially upward therefrom and radially spaced from the inner closure rim, forming in conjunction with the inner closure rim and the seal portion a downwardly extending annular seal member for insertion into the annular space between the inner container rim and the outer container rim for resilient mechanical entrapment and sealing engagement with the open end of the container, and forming with the inner closure rim a pair of concentric spaced closure rims for prevention of the transfer of forces imposed on one of the pair of said rims to the other of said pair, said seal member, in cross section, narrowing and tapering axially upward from the seal portion and defining a substantially conical cross-section, the inner closure rim and the outer closure rim each, in cross section, narrowing downward in joining with the seal portion, thereby forming a stronger resilient seal with the container rim portion.

14. The invention according to claim 13 and the end closure bridge member projecting axially upward beyond the apex of the outer closure rim, and an annular bead projecting radially outward and axially downward from the lower end of said cylindrical wall, thereby rendering the container more stackable by being engageable with the upper portion of the end closure of a second container with end closure of substantially identical configuration, engaging the second container by abutting the bottom member of the first container against the axially upper surface of the closure bridge member of the second container, and by abutting the annular bead of the first container against the apex of the outer closure rim of the second container.

15. The invention according to claim 13 where said inner and outer container rims define an annular space between said rims, said annular space narrowing upwardly from the lower end of said annular space, and said axially downwardly extending end closure seal member narrowing upwardly from its lower end thereby strengthening the mechanically resilient seal between the container and the end closure.

16. The invention according to claim 13 and a shoulder formed integral with the radially outward facing surface of the outer closure rim and extending radially outward above the outer container rim defining an annular gap between said shoulder and the apex of the outer container rim, thereby permitting easy introduction of a prying tool between the end closure and the container for the unsealing thereof.

17. The invention according to claim 13 and the inner rim of the container rim structure being ported for enabling fluid to flow from the annular space between the inner rim of the container rim structure and the outer rim of the container rim structure.

18. The invention according to claim 13 where the lower surface of the inner annular portion of the end closure, the lower surface of the closure bridge member, and the radially inner surface of the inner closure rim are in sealing engagement with the radially inner surface of the inner container ring, the top surface of the inner container ring, and the radially outer surface of the inner container ring, respectively, thereby forming a double lock seal.

19. The invention according to claim 13 and in which the upper open end of the cylindrical wall is comprised of an axially upward extending taper portion, and the radially inward edge of the container bridge member is formed integral with the upper terminal end of said taper portion.

20. The invention according to claim 19 and a shoulder formed integral with the radially outward facing surface of the outer closure rim and extending radially outward above the outer container rim defining an annular gap between said shoulder and the apex of the outer container rim, thereby permitting easy introduction of a prying tool between the end closure and the container for the unsealing thereof.

21. The invention according to claim 19 and the end closure bridge member projecting axially upward beyond the apex of the outer closure rim, and an annular bead projecting radially outward and axially downward from the lower end of said cylindrical wall, thereby rendering the container more stackable by being engageable with the upper portion of the end closure of a second container with end closure of substantially identical configuration, engaging the second container by abutting the bottom member of the first container against the axially upper surface of the closure bridge member of the second container, and by abutting the annular bead of the first container against the apex of the outer closure rim of the second container.

22. The invention as defined in claim 19 together with a plurality of upright gusset support members formed integral with radially outward facing surface of said upper open end wall taper portion and with a lower surface portion of said container bridge member for increasing the axial and radial strength of said container rim system.

23. The invention as defined in claim 19 together with an annular hoop strength increasing rim formed integral with a radially outward facing surface portion of said wall taper portion for increasing the radial strength of said open end.

* * * * *